US007883200B2

(12) United States Patent
Koga et al.

(10) Patent No.: US 7,883,200 B2
(45) **Date of Patent: *Feb. 8, 2011**

(54) RECORDING SHEET AND IMAGE RECORDING METHOD USING THE SAME

(75) Inventors: Chizuru Koga, Ebina (JP); Kiyoshi Hosoi, Ebina (JP); Takashi Ogino, Ebina (JP); Tsukasa Matsuda, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 27 days.

This patent is subject to a terminal disclaimer.

(21) Appl. No.: 11/979,437

(22) Filed: Nov. 2, 2007

(65) Prior Publication Data

US 2008/0063958 A1 Mar. 13, 2008

Related U.S. Application Data

(62) Division of application No. 10/866,030, filed on Jun. 14, 2004, now abandoned.

(30) Foreign Application Priority Data

Jun. 16, 2003 (JP) ............................ 2003-170949

(51) Int. Cl.
*C09D 11/00* (2006.01)

(52) U.S. Cl. ........................ 347/100; 347/95; 347/101; 428/32.1; 428/84; 428/153; 106/31.13

(58) Field of Classification Search ................ 347/100, 347/95, 101, 105; 428/32.1, 195, 84, 153; 106/31.13
See application file for complete search history.

(56) References Cited

U.S. PATENT DOCUMENTS

| | | | | |
|---|---|---|---|---|
| 4,325,735 | A | 4/1982 | Ohta et al. | |
| 5,142,327 | A | 8/1992 | Kahle | |
| 5,190,563 | A | 3/1993 | Hernon et al. | |
| 5,302,439 | A | 4/1994 | Malhotra et al. | |
| 5,441,795 | A | 8/1995 | Malhotra et al. | |
| 5,451,458 | A | 9/1995 | Malhotra | |
| 5,451,466 | A | 9/1995 | Malhotra | |
| 5,457,486 | A | 10/1995 | Malhotra et al. | |
| 5,541,002 | A | 7/1996 | Hosoi et al. | |
| 5,589,277 | A | 12/1996 | Malhotra | |
| 5,657,064 | A | 8/1997 | Malhotra | |
| 5,659,348 | A | 8/1997 | Malhotra | |
| 5,663,022 | A | 9/1997 | Malhotra | |
| 5,757,408 | A | 5/1998 | Malhotra | |
| 5,882,390 | A * | 3/1999 | Nagai et al. | 106/31.49 |
| 5,882,754 | A | 3/1999 | Kuroyama et al. | |
| 5,922,910 | A | 7/1999 | Labat et al. | |
| 5,928,765 | A | 7/1999 | Malhotra | |
| 6,117,527 | A | 9/2000 | Schwarz | |
| 6,221,198 | B1 | 4/2001 | Gryska et al. | |
| 6,383,612 | B1 * | 5/2002 | Waller et al. | 428/32.17 |
| 6,482,503 | B1 | 11/2002 | Malhotra | |
| 6,537,650 | B1 | 3/2003 | Waller, Jr. et al. | |
| 6,786,586 | B2 | 9/2004 | Koga et al. | |
| 6,800,429 | B2 | 10/2004 | Lelental et al. | |
| 7,510,750 | B2 * | 3/2009 | Koga et al. | 428/32.11 |
| 2003/0048344 | A1 | 3/2003 | Koga et al. | |
| 2003/0124320 | A1 | 7/2003 | Malhotra | |
| 2003/0141487 | A1 | 7/2003 | Lelental et al. | |
| 2003/0179566 | A1 * | 9/2003 | Ito | 362/31 |
| 2003/0188838 | A1 | 10/2003 | Yancey et al. | |
| 2003/0192659 | A1 | 10/2003 | Yancey et al. | |
| 2003/0227531 | A1 * | 12/2003 | Hosoi et al. | 347/105 |
| 2003/0234846 | A1 * | 12/2003 | Koga et al. | 347/100 |
| 2004/0035323 | A1 * | 2/2004 | Suzuki et al. | 106/31.65 |
| 2004/0121093 | A1 | 6/2004 | Ogino et al. | |
| 2004/0202825 | A1 | 10/2004 | Malhotra | |
| 2005/0244592 | A1 | 11/2005 | Koga et al. | |

FOREIGN PATENT DOCUMENTS

| | | |
|---|---|---|
| CN | 1352599 | 6/2002 |
| JP | 61-74880 | 4/1986 |
| JP | A-07-257017 | 10/1995 |
| JP | A-08-216498 | 8/1996 |
| JP | 8-244335 | 9/1996 |
| JP | A-09-176995 | 7/1997 |
| JP | A-9-290556 | 11/1997 |
| JP | A-10-86527 | 4/1998 |
| JP | A-10-100531 | 4/1998 |
| JP | A-10-166713 | 6/1998 |
| JP | A-10-305656 | 11/1998 |
| JP | A-11-174718 | 7/1999 |
| JP | A-2000-094825 | 4/2000 |
| JP | A-2001-054976 | 2/2001 |
| JP | A-2001-147545 | 5/2001 |
| JP | A-2002-096547 | 4/2002 |
| JP | A-2002-144719 | 5/2002 |
| JP | A 2002-154270 | 5/2002 |
| JP | A 2002-166644 | 6/2002 |
| JP | A-2002-172851 | 6/2002 |
| JP | A-2003-003093 | 1/2003 |
| JP | A 2003-11492 | 1/2003 |
| JP | A-2003-072230 | 3/2003 |
| JP | A-2003-191607 | 7/2003 |
| JP | A-2003-326844 | 11/2003 |
| JP | A-2004-114627 | 4/2004 |
| WO | WO 99/06219 | 2/1999 |
| WO | WO 00/44568 | 8/2000 |

* cited by examiner

*Primary Examiner*—Stephen D Meier
*Assistant Examiner*—Laura E Martin
(74) *Attorney, Agent, or Firm*—Oliff & Berridge, PLC

(57) ABSTRACT

A recording sheet including base paper including pulp fiber and filler, wherein the recording sheet further includes carboxylic acid. An ink jet recording method and an electrophotographic image recording method using the recording sheet.

5 Claims, No Drawings

RECORDING SHEET AND IMAGE RECORDING METHOD USING THE SAME

CROSS-REFERENCE TO RELATED APPLICATION

This is a Division of application Ser. No. 10/866,030 filed Jun. 14, 2004, which in turn claims priority under 35 USC 119 from Japanese Application No. 2003-170949, the disclosures of which are incorporated by reference herein.

BACKGROUND OF THE INVENTION

1. Field of the Invention

The present invention relates to a recording sheet and an image recording method using the recording sheet. Particularly, the invention relates to a recording sheet having a surface that is not subjected to special coating, or so-called plain paper, and an image recording method for ink jet recording and electrophotographic recording using the recording sheet.

2. Description of the Related Art

The ink jet recording method is characterized in that color printing is easy, energy consumption is low, a low level of noise is generated during recording, and printers therefor are manufactured with low costs. Ink jet recording devices have been widely used in offices in recent years due to such advantages, and are often used together with electrophotographic apparatus such as a laser printer and copiers.

Recording media (recording sheets) such as so-called plain paper, a colorless film and a transparent film are used for the ink jet recording method. In particular, the plain paper is most frequently used when the ink jet recording device is used in the office together with a laser printer or copier, since images are readily formed on the plain paper using these electrophotographic recording machines, and since the plain paper is inexpensive and readily available. Accordingly, it is quite important to improve printability of the ink jet recording method on the plain paper. However, there have been the following problems in printing on the plain paper by conventional ink jet recording methods.

(1) A so-called feathering phenomenon occurs by efflux of the ink along the fiber of paper. Image quality of letters, particularly of special letters, is largely impaired by this feathering phenomenon.

(2) The surface of the so-called plain paper is usually sized (made to be water repellent). Consequently, adsorption of the ink is retarded, and so-called inter color bleeding (ICB) occurs at the portions where different colors contact one another.

(3) Portions in contact with printed surfaces become stained when printed documents are piled since absorption of the ink is retarded due to sizing (water repellent treatment) applied on the surface of the paper.

(4) Colorants in the ink tend not to stay on the surface of the plain paper, whereby coloring is insufficient.

(5) Printed images can be seen from the back surface (from the surface opposed to the printed surface) through the paper since the colorants in the ink permeate into the paper to make printing on both surfaces impossible.

While the ink jet printer is desired to have a high printing speed comparable to that of the laser printer for extending the use of the ink jet printer into office uses, it has been quite difficult to establish compatibility among ink absorption (dryability), improved image quality and applicability to two-sided printing.

In a method proposed for solving these problems, coagulation and precipitation of ink components are accelerated using a recording sheet whose surface is treated with cationic substances such as cationic polymers and multivalent metal salts for improving image quality. However, the effect of accelerating coagulation and precipitation is weakened, and in particular feathering becomes evident, when a rapidly permeating ink such as that used for high speed printing is used. Since surface treatment with ionic substances results in a decrease in electrical resistance of the sheet due to an excessive reaction to environmental changes, transfer of toners in a laser printer or copier using the electrophotographic method may be adversely affected (see, for example, Japanese Patent Application Laid-Open (JP-A) Nos. 10-166713, 7-257017, 8-216498 and 10-100531).

SUMMARY OF THE INVENTION

The present invention has been made in view of the above circumstances and provides a recording sheet that can be used for the ink jet recording method as well as for the electrophotographic recording method, and an image recording method using the recording sheet. When the recording sheet of the invention is used for ink jet printing, ink is rapidly dried, an obtained image has a high image density, inter color bleeding (ICB) and feathering seldom occur, and the image density seen through the recording sheet from the back thereof is low.

A first aspect of the invention is to provide a recording sheet including base paper including pulp fiber and filler, wherein the recording sheet further includes carboxylic acid.

A second aspect of the invention is to provide an ink jet image recording method for recording an image on the recording sheet of the first aspect. The method includes ejecting droplets of an ink that includes a hydrophilic colorant and at least one of water and a water -soluble organic solvent on a surface of the recording sheet so as to record an image thereon.

A third aspect of the invention is to provide an electrophotographic image recording method including: uniformly charging a surface of an electrostatic latent image holding member; exposing the surface of the electrostatic latent image holding member to form an electrostatic latent image; developing the electrostatic latent image formed on the surface of the electrostatic latent image holding member using an electrostatic image developer to form a toner image; transferring the toner image onto the recording sheet of the first aspect; and fixing the toner image on the recording sheet.

DETAILED DESCRIPTION OF THE INVENTION

<Recording Sheet>

The present invention provides a carboxylic acid-containing recording sheet including base paper mainly composed of pulp fiber and filler.

The carboxylic acid-containing recording sheet permits an ink to be rapidly dried, an obtained image to have a high image density, the extent of inter color bleeding (ICB) and feathering to be small, and the image density seen from the back of the recording sheet through the recording sheet to be low when the image is printed by an ink jet method to be described hereinafter.

The reason of aforementioned advantages is that the carboxylic acid contained in the recording sheet permits the colorants in the ink to be insolubilized by rapid dissociation of the carboxylic acid when the ink contacts the surface of the recording sheet. Inter color bleeding and feathering are effectively prevented from occurring particularly when a highly permeable ink is used, and an action for obtaining an image with a higher image quality is evidently exhibited. When the ink contains a water-soluble polymer having a hydrophobic portion and hydrophilic portion as will be described below, on the other hand, the colorant is more readily insolubilized since dissociation of the carboxyl group in the hydrophilic portion of the water-soluble polymer is suppressed, and the image quality improving effect is further enhanced.

The base paper used for the recording sheet of the invention will be described below.

The base paper used for the recording sheet of the invention is mainly composed of pulp fiber and filler.

Examples of the preferably used pulp fiber include chemical pulps such as hard-wood bleached kraft pulps, hard-wood unbleached kraft pulps, soft-wood bleached kraft pulps, soft-wood unbleached kraft pulps, hard-wood bleached sulfite pulps, hard-wood unbleached sulfite pulps, soft-wood bleached sulfite pulps and soft-wood unbleached sulfite pulps as well as chemically processed pulps from fiber materials such as wood, cotton and bast fiber.

Other pulps available include ground wood pulps prepared from mechanically pulped timbers and wood chips, chemi-mechanical pulps prepared by mechanical pulping of timbers and wood chips after impregnating them with chemicals, and thermomechanical pulps prepared by pulping with a refiner after cooking the wood chip until it is a little softened. Either virgin pulps only or used paper pulps may be used together, if necessary.

The virgin pulp is preferably bleached by a bleaching method in which chlorine dioxide is used in place of using chlorine gas. (elementally chlorine-free (ECF) method), or by a bleaching method in which ozone and hydrogen peroxide are mainly used without using chlorinated compounds at all (total chlorine free (TCF) method).

Materials capable of blending with the used paper pulp include non-printed used paper such as non-printed high quality, middle quality and woody paper and spoilage after cutting into prescribed length and width in bookbinding, printing and cutting processes; high quality printed paper such as wood free paper after printing and copying and high quality coated paper; used paper after writing with an oil-base ink and water-base ink; recycles newspaper containing leaflets including printed woody paper, wood free coated paper, wood containing paper and wood containing coated paper; and other recycles paper such as wood containing paper, wood containing coated paper and woody paper.

The recycled pulps of the base paper used in the invention are preferably obtained by treating the used base paper by at least one of ozone bleaching and hydrogen peroxide bleaching. The blending ratio of the used paper pulp obtained by the bleaching treatment above is preferably in the range of 50 to 100% by mass from the view point of obtaining a recording sheet having a higher degree of brightness. It is more preferable to use the used paper pulp in the range of 70 to 100% by mass from the view point of recycling of resources.

The ozone bleaching treatment has an action for decomposing fluorescent dyes usually contained in wood free paper, while the hydrogen peroxide treatment has an action for preventing the recording paper from being yellowish due to an alkali used for deinking.

Deinking of used paper is facilitated while brightness of the pulp is improved by treating the used paper pulp by a combination of ozone bleaching and hydrogen peroxide bleaching. Since such treatment has an action for removing residual chlorine compounds in the pulp by decomposition, it is quite useful for reducing the content of organic halogen compounds in used paper using chlorine-bleached pulps.

Filler is added to the base paper used in the invention in addition to the pulp fiber for controlling opaqueness, brightness and surface properties. Filler not containing halogen compounds is preferably used when the content of the halogen in the recording sheet is to be reduced.

Examples of the filler include inorganic pigments such as ground calcium carbonate, precipitated calcium carbonate, chalk, kaolin, fired clay, talk, calcium sulfate, barium sulfate, titanium dioxide, zinc oxide, zinc sulfide, zinc carbonate, aluminum silicate, calcium silicate, magnesium silicate, synthetic silica, aluminum hydroxide, alumina, sericite, white carbon, saponite, calcium montmorillonite, sodium montmorillonite and bentonite; and organic pigments such as acrylic plastic pigment, polyethylene and urea resins. When a used paper pulp is blended with the base paper, the amount of blending should be controlled by assuming the amount of ashes in the used paper pulp.

While the amount of blending of the filler is not particularly restricted, it is preferably in the range of 1 to 80 parts by mass, more preferably in the range of 1 to 30 parts by mass, based on 100 parts by mass of the pulp fiber.

The fiber orientation ratio of the base paper is preferably in the range of 1.0 to 1.55, more preferably in the range of 1.0 to 1.45, and further preferably in the range of 1.0 to 1.35, for obtaining the base paper from the pulp fiber. Curl of the recording sheet after printing by the ink jet method may be relieved when the orientation ratio of the fiber falls within the range of 1.0 to 1.55.

The fiber orientation ratio is determined by measuring ultrasonic wave propagation speed, and is defined by the ratio of the ultrasonic wave propagation speed in a MD direction (the direction of advance of a paper machine) of the recording sheet to the ultrasonic wave propagation speed in a CD direction (the direction perpendicular to the direction of advance of the paper machine) of the recording sheet as represented by the following equation (1).

Fiber orientation ratio (T/Y ratio) of the base paper by the ultrasonic wave propagation speed method=(ultrasonic wave propagation speed in MD direction)/(ultrasonic wave propagation speed in CD direction) (1).

The fiber orientation ratio by the ultrasonic wave propagation speed method is measured using Sonic Sheet Tester (trade name, manufactured by Nomura Shoji Inc.).

While the recording sheet of the invention is characterized in containing the carboxylic acid as described previously, this means that the carboxylic acid is present at least on the surface of the base paper, and the carboxylic acid may be present within the base paper.

Preferably, the carboxylic acid of the invention has a cyclic structure. It is more preferable that the carboxylic acid is directly bonded to the cyclic structure. Examples of the cyclic structure include a benzene ring, cycloalkyl ring and heterocyclic ring, preferably the heterocyclic ring, and more preferably the heterocyclic ring containing oxygen and/or nitrogen.

Examples of the carboxylic acid include carboxylic acids having a furan structure such as 2-furan carboxylic acid, 3-furan carboxylic acid, 5-methyl-2-furan carboxylic acid, 2,5-dimethyl-3-furan carboxylic acid, 2,5-furan carboxylic acid, 2-(2-furyl)acrylic acid and furylic acid; carboxylic acids having a hydrofuran structure such as butyrolactone-β-carboxylic acid, 4-methyl-4-pentanolide-3-carboxylic acid, 4-methyl-4-pentanolide-3-acetic acid and 3-buten-4-olido-3-carboxylic acid; carboxylic acids having a pyran structure such as 2-benzofuran carboxylic acid, 2-pyrone-6-carboxylic acid, 4-purone-2-carboxylic acid, 5-hydroxy-4-pyrone-2-carboxylic acid, 4-pyrone-2,6-dicarboxylic acid and 3-hydroxy-4-pyrone-2,6-dicarboxylic acid; coumalic acid (coumalinic acid); thiophene carboxylic acid; 2-α-pyrrole carboxylic acid, 2-β-pyrrole carboxylic acid, pyrrole-N-carboxylic acid, 2,3-dimethylpyrrole-4-propionic acid, 2,4,5-trimethylpyrrole-3-propionic acid; 2,5-dioxo-4-methyl-3-pyrroline-3-propionic acid; carboxylic acids having a pyrrolidine structure such as 2-pyrrolidine carboxylic acid (proline), 4-hydroxyprolone, 1-methylpyrrolidine -2-carboxylic acid, 2-pyrrolidone carboxylic acid and 5-carboxy-1-methylpyrrolidine-2-acetic acid; carboxylic acids having an indole structure such as 3-hydroxy-2-indole carboxylic acid, 3-indole carboxylic acid, 3-indole acetic acid, tryptophane and N-methyl tryptophane; pyridine derivatives such as 2-pyridine carboxylic acid, 3-pyridine carboxylic acid, 4-pyridine carboxylic acid, 2,3-pyridine dicarboxylic acid, 2,4-pyridine dicarboxylic acid, 2,5-pyridine dicarboxylic acid, 2,6-pyridine dicarboxylic acid, 3,4-pyridine dicarboxylic acid, 3,6-pyridine dicarboxylic acid, 2,3,4-pyridine tricarboxylic acid, 2,3,5-pyridine tricarboxylic acid, 2,4,5-pyridine tricarboxylic acid, 3,4,5-pyridine tricarboxylic acid, pyridine pentacarboxylic acid and 1,2,5,6-tetrahydro-1-methyl nicotine; and carboxylic acids having a quinoline structure such as 2-quinoline carboxylic acid, 4-quinoline carboxylic acid, 2-phenyl-4-quinoline carboxylic acid, 2,3-quinoline dicarboxylic acid, 4-hydroxy-2-quinoline carboxylic acid and 6-methoxy-4-quinoline carboxylic acid. However, the carboxylic acid is not restricted thereto. The carboxylic acids having a nitrogen-containing heterocyclic structure and oxygen-containing heterocyclic structure are highly effective among them, and 2-pyrrolidone carboxylic acid, coumalic acid (coumalinic acid) and furan carboxylic acid are particularly preferable since they are readily soluble in water and have a high image improving effect.

The carboxylic acid of the invention preferably has a solubility in water of not less than 1 g per 100 g of $H_2O$, more preferably not less than 5 g per 100 g of $H_2O$, and further preferably not less than 20 g per 100 g of $H_2O$ at 20° C. The desired effect cannot be obtained when the solubility of the carboxylic acid is less than 1 g per 100 g of $H_2O$ at 20° C. since the carboxylic acid is not ionized when the ink bombards the surface of the recording sheet.

The solubility of the carboxylic acid refers to a mass (g) of the carboxylic acid when it is dissolved in 100 g of water at a saturation concentration at 20° C.

The carboxylic acid is preferably coated on the surface of the base paper by applying a size-press treatment on the surface of the base paper using a coating liquid (a size-press liquid) containing the carboxylic acid and a water-soluble resin.

While the water-soluble resin is not particularly limited as far as it is a water-soluble polymer, examples thereof include carboxymethyl cellulose, curdlan, polyvinyl alcohol, modified cationic polyvinyl alcohol, cationic starch, oxidized starch, anionic starch and nonionic starch.

The coating liquid may be applied on the surface of the base paper by usually used coating means such as a shim size, gate roll, roll coater, bar coater, air knife coater, rod blade coater and blade coater other than the size press treatment. The recording sheet of the invention is obtained by drying the base paper coated with the carboxylic acid.

The coated amount of the carboxylic acid is preferably in the range of 0.1 to 5 g/m$^2$, more preferably in the range of 0.2 to 3 g/m$^2$. The image quality is deteriorated or, in other words, the image density may decrease and feathering, ICB and color reproducibility may become worse when the amount of coating is less than 0.1 g/m$^2$ because reactivity between the carboxylic acid and ink components decreases. On the contrary, so-called feeling as plain paper is impaired when the coated amount exceeds 5 g/m$^2$.

The sizing degree of the recording sheet of the invention may be adjusted to a required value by controlling the amount and kind of binders. However, a surface sizing agent may be used when the sizing degree cannot be sufficiently controlled by the method described above. Examples of such surface sizing agent include rosin base sizing agents, synthetic sizing agents, petroleum base sizing agent, neutral sizing agent, starch and polyvinyl alcohol. The sizing degree may be controlled before forming the base paper by blending the sizing agent in a slurry preparation step in the paper making process. An internal sizing agent or surface sizing agent free from halogens is preferably used when the amount of halogens in the recording sheet is to be reduced. Particularly, the rosin base sizing agent, synthetic sizing agent, petroleum resin base sizing agent and neutral sizing agent may be used. The sizing agent and a fixing agent of the fiber may be combined for use. The fixing agents available in this case are aluminum sulfate and cationic starch. The neutral sizing agent is preferably used for improving storability of the recording sheet. The sizing degree may be adjusted by controlling the amount of addition of the sizing agent.

The recording sheet used in the invention preferably has a Stockigt sizing degree in the range of 10 to 60 seconds, more preferably in the range of 15 to 30 seconds. Practical applicability may be impaired when the Stockigt sizing degree is less than 10 seconds such that fine letters printed by the ink jet recording method are hardly distinguishable due to worsening of feathering and printed bar-cords are hardly readable. When the Stockigt sizing degree exceeds 60 seconds, on the other hand, the quality of the color image is deteriorated due to occurrence of inter color bleeding since permeation of the ink is retarded while the back surface of the recording paper becomes stained due to poor dryability of the ink.

The Stockigt sizing degree is measured according to JIS P8122:1976 in a standard environment (23° C. and 50% RH) prescribed in JIS P8111:1998.

The recording sheet of the invention can be used for forming an image by the electrophotographic method in addition to printing by the ink jet recording method. The smoothness of the recording sheet is preferably in the range of not less than 20 to 100 seconds, more preferably in the range of 70 to 100 seconds, for obtaining good toner transcription ability and for improving granularity. Granularity may become poor when smoothness is less than 20 seconds, while high pressure press at an wet state is necessary for obtaining a high degree of smoothness when smoothness exceeds 100 seconds to result in poor transparency of the sheet or large curling of the sheet after ink jet printing. Smoothness is measured according to JIS-P-8119:1998.

The recording sheet of the invention preferably has a formation index of preferably not less than 20, more preferably not less than 30, for improving cloudy mottling when the image is formed by the electrophotographic method. When the formation index is lass than 20, the toner unevenly permeates into the recording sheet when the toner is fused by heating in the electrophotographic method to generate mottling and to impair the image quality.

The formation index is measured using a three-dimensional (3D) sheet analyzer M/K 950 (trade names, manufactured by M/K Systems, Inc.) and a micro-formation tester (MFT) with a diaphragm aperture of the analyzer of 1.5 mm. A sample is placed on a rotary drum of the 3D sheet analyzer, and a local difference of basis weight on the sample is measured as a difference of the luminous energy using a light source attached to the axis of the drum and a photo-detector attached at the outside of the drum so as to face the light source. The measuring range is determined by the radius of the diaphragm aperture attached at a light receiving part of the photo-detector. Then, the difference of the luminous energy (deviation) is amplified, and the amplified signals are converted into digital signals. The digital signal is classified into 64 optical basis weight classes, and 106 data are obtained by one scanning to establish a histogram of the data. The highest frequency of the histogram (peak value) is divided by the number of classes having a frequency of not less than 100 of the classes classified into 64 fine basis weight classes. The formation index is calculated by multiplying the result of division by 1/100. The larger formation index shows better formation.

The surface electrical resistivity of the recording sheet is preferably controlled by blending a conductive agent when the recording sheet is used not only for the ink jet recording method but also for the electrophotographic method and thermal transfer method as well as for a recording medium commonly used for these methods. However, conductive agents containing no halogen compounds are preferably used for reducing the content of halogens in the recording sheet. Examples of such conductive agent available include inorganic electrolytes such as sodium sulfate, sodium carbonate, lithium carbonate sodium metasilicate, sodium tripolyphosphate and sodium metaphosphate; anionic surfactants such as sulfonate salts, sulfonate ester salts, carboxylate salts and phosphate salts; cationic surfactants; nonionic surfactants such as polyethyleneglycol, glycerin and sorbit; amphoteric surfactants; and polymer electrolytes.

It is preferable to adjust air resistance of the base paper in the range of 10 to 30 seconds by subjecting the base paper before coating to calender processing for controlling permeation of the coating liquid into the base paper in the process for coating the coating liquid containing the carboxylic acid and water-soluble resin. Increasing air resistance of the base paper permits the coating liquid to be suppressed from permeating into the base paper. However, ink permeability during ink jet printing is also inhibited when air resistance of the base paper is too high to cause deterioration of inter color bleeding and dryability. Accordingly, air resistance of the base paper is preferably controlled by taking these conditions into consideration.

It is also effective for reducing permeation of the coating liquid into the base paper to increase the viscosity of the coating liquid by using starch, polyvinyl alcohol and derivatives thereof as binders of the coating liquid.

Alternatively, permeation of the coating liquid into the base paper may be reduced by subjecting the dried base paper, which is not subjected to a size-press step after forming the base paper, to a different size-press step.

The recording sheet of the invention has surface resistivity preferably in the range of $1.0\times10^9$ to $1.0\times10^{11}\Omega/\square$, more preferably in the range of $5.0\times10^9$ to $7.0\times10^{10}\Omega/\square$, and further preferably in the range of $5.0\times10^9$ to $2.0\times10^{10}\Omega/\square$ at the printing side (printing surface). The printing surface refers to a coated surface when the carboxylic acid is coated on one surface of the base paper.

The recording sheet of the invention has a volume electric resistivity preferably in the range of $1.0\times10^{10}$ to $1.0\times10^{12}$ $\Omega\cdot$cm, more preferably in the range of $1.3\times10^{10}$ to $1.6\times10^{11}$ $\Omega\cdot$cm, and further preferably in the range of $1.3\times10^{10}$ to $4.3\times10^{10}$ $\Omega\cdot$cm.

(Ink Jet Image Recording Method)

The ink jet image recording method (abbreviated as ink jet recording method hereinafter) of the invention will be described below. The ink jet recording method of the invention is not particularly restricted so long as the recording sheet of the invention is used for printing. In the ink jet recording method of the invention, the image is recorded on the recording sheet by ejecting drops of the ink including at least water and/or a water-soluble organic solvent and hydrophilic colorants. The recording sheet of the invention is used for ink jet recording. While the ink used in the invention is not particularly restricted and known inks may be used, the ink preferably contains water and the hydrophilic colorants, more preferably a water-soluble polymer having hydrophobic portions and hydrophilic portions.

Dyes and a pigment dispersant having hydrophilic groups are used together in the hydrophilic colorant in addition to the dye. Consequently, the hydrophobic pigment as well as self-dispersible pigments to be described hereinafter may be dispersed in the ink. Known water-soluble organic solvents other than water may be used as the solvent, and various additives such as surfactants may be added, if necessary.

The ink favorably used in the ink jet recording method of the invention contains the hydrophilic colorants. An ink set used for multicolor printing may include at least black, cyan, magenta and yellow inks, which are preferably prepared by blending with water, water-soluble organic solvent, colorants, a surfactant and a water-soluble polymer.

Each ink in the ink set contains water, a water-soluble organic solvent, colorants, a surfactant and a water-soluble polymer, and the self-dispersible pigment (a pigment capable of being dispersed in water without using any pigment dispersants) is often used when a pigment is used for the colorant. The self-dispersible pigment has many hydrophilic groups on the surface thereof, and is able to be dispersed in the ink in the absence of the pigment dispersant.

The self-dispersible pigment of the invention satisfies the following conditions.

The pigment is dispersed in water using a dispersion device such as an ultrasonic homogenizer, a nanomizer, a microfluidizer and a ball mill without using any pigment dispersants so that the concentration of the pigment is 5% by mass based on 95% by mass of water. The dispersion solution in which the pigment is dispersed is then filled in a glass bottle, which is allowed to stand for 24 hours. The pigment is defined to be a self-dispersible pigment when the concentration of the pigment in the supernatant after standing is not less than 98% of the initial pigment concentration. The method for measuring the concentration of the pigment is not particularly restricted. The concentration of the pigment may be determined either by measuring the solid fraction after drying the dispersion solution, or by measuring transmittance after diluting the dispersion solution to an appropriate concentration. However, any methods available for the accurate measurement of the pigment concentration may be used.

The self-dispersible pigment can be manufactured by subjecting a usual pigment to an acid/base treatment, a coupling agent treatment, a polymer graft treatment, a plasma treatment or a redox surface treatment. Applying such surface treatment permits the usual pigment to contain many hydrophilic groups, and enables the pigment to be dispersed in the ink without using any pigment dispersants.

While the pigment subjected to the surface treatment is not particularly restricted, examples of the pigment are as follows.

Examples of the black pigment include Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080 and Raven 1060 (manufactured by Columbian D. Carbon Co.); Regal 1400R, Regal 1330R, Regal 1660R, Mogul L, Black Pearls L, Monarch 700, Monarch 800, Monarch 880, Monarch 900, Monarch 1000, Monarch 1100, Monarch 1300 and Monarch 1400 (manufactured by Cabot Co); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (manufactured by Degussa Co.); and No. 25, No. 33, No. 40, No. 47, No. 52, No. 900, No. 2300, MCF-88, MA 600, MA 7, MA 8 and MA 100 (manufactured by Mitsubishi Chemical Co.).

Examples of the cyan pigment include C.I. Pigment Blue-1, C.I. Pigment Blue-2, C.I. Pigment Blue-3, C.I. Pigment Blue-15, C.I. Pigment Blue-15:1, C.I. Pigment Blue-15:3, C.I. Pigment Blue-15:34, C.I. Pigment Blue-16, C.I. Pigment Blue-22 and C.I. Pigment Blue-60.

Examples of the magenta pigment include C.I. Pigment Red-5, C.I. Pigment Red-7, C.I. Pigment Red-12, C.I. Pigment Red-48, C.I. Pigment Red-48:1, C.I. Pigment Red-57, C.I. Pigment Red-112, C.I Pigment Red-122, C.I. Pigment Red-123, C.I. Pigment Red-146, C.I. Pigment Red-168, C.I. Pigment Red-184 and C.I. Pigment Red-202.

Examples of the yellow pigment include C.I. Pigment yellow-1, C.I. Pigment yellow-2, C.I. Pigment yellow-3, C.I. Pigment yellow-12, C.I. Pigment yellow-13, C.I. Pigment yellow-14, C.I. Pigment yellow-16, C.I. Pigment yellow-17, C.I. Pigment yellow-73, C.I. Pigment yellow-74, C.I. Pigment yellow-75, C.I. Pigment yellow-83, C.I. Pigment yellow-93, C.I. Pigment yellow-95, C.I. Pigment yellow-97, C.I. Pigment yellow -98, C.I Pigment yellow-114, C.I Pigment yellow-128, C.I Pigment yellow-129, C.I. Pigment yellow-152 and C.I Pigment yellow-154.

Magnetic fine particles such as magnetite and ferrite, and titanium black may be used in the invention.

Commercially available self-dispersible pigment may be directly used. Examples of the commercially available self-dispersible pigment include cab-o-jet-200, cab-o-jet-300, IJX-55, IJX-164, IJX-253, IJX-266 and IJX-273 manufactured by Cabot Corporation; and Microjet black CW-1 manufactured by Nippon Shokubai Co., Ltd.

The hydrophilic group contained in the self-dispersible pigment may be any one of nonionic, cationic and anionic groups. Mainly sulfonate, carboxylate, hydroxyl, phosphate groups and the like are preferable. While sulfonate, carboxylate and phosphate groups may be directly used, they may form salts. The counter-ion of the acid that forms a salt is preferably Li, Na, K, $NH_4$ or an amine.

The content of the pigment based on the total mass of the ink is preferably in the range of 0.1 to 15% by mass, more preferably in the range of 0.5 to 10% by mass, and further preferably in the range of 1.0 to 8.0% by mass. Clogging is liable to occur at the tip of the print head when the content of the pigment exceeds 15% by mass, while a sufficient image density cannot be obtained when the content is less than 0.1% by mass.

A purified products is used for the pigment. Impurities in the pigment can be removed by washing with water, by using an ultrafiltration method or ion-exchange method, active carbon or by adsorption with zeolite. While the purification method is not particularly restricted, the concentration of inorganic substances derived from the impurities of the colorant in the ink is preferably not larger than 500 ppm, more preferably not larger than 300 ppm.

Known dyes or novel synthetic dyes may be used as water-soluble colorants, or dyes. A direct dye or acid dye is preferably among the dyes since a clear color is obtained.

Examples of the blue dye include C.I. Direct Blue-1, -2, -6, -8, -22, -34, -70, -71, -76, -78, -86, -142, -199, -200, -201, -202, -203, -207-218, -236 and -287; and C.I. Acid Blue-1, -7, -9, -15, -22, -23, -27, -29, -40, -43, -55, -59, -62, -78, -80, -81, -90, -102, -104, -111, -185 and -254.

Examples of the red dye include C.I. Direct Red-1, -2, -4, -8, -9, -11, -13, -1, -20, -28, -31, -33, -37, -39, -51, -59, -62, -63, -73, -75, -80, -81, -83, -87, -90, -94, -95, -99, -101, -110 and 189; and C, I, Acid Red-1, -4, -8, -13, -14, -15, -18, -21, -26, -35, -37, -249 and -257.

Examples of the yellow dye include C.I. Direct Yellow-1, -2, -4, -8, -11, -12, -26, -27, -28, -33, -34, -41, -44, -48, -86, -87, -88, -135, -142 and -144; and C.I. Acid Yellow-1, -3, -4, -7, -11, -12, -13, -14, -19, -23, -25, -34, -38, -41, -42, -44, -53, -55, -61, -71, -76 and -79.

These dyes may be used alone, or as a mixture of at least two of them.

The cationic dye may be used other than the direct dye and acid dye. Examples of the cationic dye include C.I. basic yellow-1, -11, -13, -19, -25, -33 and -36; C.I. Basic Red-1, -2, -9, -12, -13, -38, -39 and -92; and C.I. basic blue-1, -3, -5, -9 and -19; and C.I. Basic Blue-24, -25, -26 and -28.

The combined content of the dye based on the total mass of the ink is preferably 0.1 to 10% by mass, more preferably 0.5 to 8% by mass, and further preferably 0.8 to 6% by mass. Clogging is liable to occur at the tip of the print head when the content of the dye exceeds 10% by mass, while a sufficient image density cannot be obtained when the content is less than 0.1% by mass.

Known water-soluble organic solvents may be used in the invention. Examples of the water-soluble organic solvents available include polyfunctional alcohols such as ethyleneglycol, diethyleneglycol, propyleneglycol, polypropyleneglycol, butyleneglycol, triethyleneglycol, 1,5-pentanediol, 1,2,6-hexanetriol and glycerin; polyfunctional alcohol ethers such as ethyleneglycol monomethylether, ethyleneglycol monoethylether, ethyleneglycol monobutylether, diethyleneglycol monomethylether, diethyleneglycol monoethylether, diethyleneglycol monobutylether, propyleneglycol monobutylether and dipropyleneglycol monobutylether; nitrogen-containing solvents such as pyrrolidone, N-methyl-2-pyrrolidone, cyclohexyl pyrrolidone and triethanolamine; monovalent alcohols such as ethanol, isopropanol, butanol and benzyl alcohol; sulfur-containing solvents such as thiodiethanol, thiodiglycerol, sulfolane and dimethylsulfoxide; and propylene carbonate and ethylene carbonate.

The surfactant is added for controlling the surface tension of the ink. The nonionic and anionic surfactants that hardly affect the dispersion state of the pigment are preferable as the surfactant. Examples of the surfactant available include polyoxyethylene nonylphenylether, polyoxyethylene octylphenylether, polyoxyethylene dodecylphenylether, polyoxyethylene alkylether, polyoxyethylene fatty acid ester, sorbitan fatty acid ester, polyoxyethylene sorbitan fatty acid ester, fatty acid alkylolamide, acetylene alcohol-ethylene oxide adduct, polyethyleneglycol-propyleneglycol block copolymer, polyoxyethylene ether of glycerin ester, and polyoxyethylene ether of sorbitol ester.

Examples of the anionic surfactant available include alkylbenzene sulfonate, alkylphenyl sulfonate, alkylnaphthalene sulfonate, higher fatty acid salts, sulfate ester of higher fatty acid ester, sulfonate salts, and higher alkyl sulfosuccinate.

The amphoteric surfactant may be also used. Examples of the amphoteric surfactant available include betaine, sulfobetaine, sulfate betaine and imidazole. Other amphoteric surfactants available include silicone base surfactants such as polysiloxane-polyoxyethylene adduct, fluorine base surfactants such as oxyethylene perfluoroalkyl ether, and bio-surfactants such as spicrispolic acid, rhamnolipid and lysolecithin.

Examples of the water-soluble resin contained in the ink of the invention include alginic acid salts, acrylic acid salts and sodium carboxymethyl cellulose. The water-soluble polymer preferably contains hydrophobic portions and hydrophilic portions. The hydrophilic portion of the water-soluble polymer may include the carboxyl group. A copolymer obtained from a monomer having α,β-ethylenic unsaturated group constituting the hydrophilic portion and a monomer having α,β-ethylenic unsaturated group constituting the hydrophobic portion are preferable as the water-soluble polymers. It is more preferable that the monomer constituting the hydrophilic portion is at least one selected from a group consisting of acrylic acid, methacrylic acid, maleic anhydride and maleic acid, and the monomer constituting the hydrophobic portion is at least one selected from a group consisting of alkyl, aryl and alkylaryl esters of styrene acrylic acid or styrene methacrylic acid.

The water-soluble polymer has a molecular weight in the range of 3,000 to 15,000, preferably in the range of 4,000 to 10,000, and more preferably in the range of 4,000 to 7,000 as measured by gel permeation chromatography (GPC).

While the monomer having the α,β-ethylenic unsaturated group constituting the hydrophilic portion is not particularly restricted, examples thereof include monomers having carboxylate or sulfonate groups, for example acrylic acid, methacrylic acid, crotonic acid, itaconic acid, itaconate monoester, maleic acid, maleic anhydride, maleic monoester, fumaric acid, fumaric monoester, vinylsulfonic acid, styrenesulfonic acid and sulfonated vinylnaphthalane. Monomers having a carboxyl group are preferable among them, and methacrylic acid, maleic acid and maleic anhydride are particularly preferable. These monomers may be used alone, or as a mixture of at least two of them.

While the monomer having the α,β-unsaturated group constituting the hydrophobic portion is not particularly restricted, preferably used monomers include styrene, styrene derivatives such as a-methylstyrene and vinyltoluene, vinylnaphthalene, vinylnaphthalene derivatives, alkyl acrylate, alkyl methacrylate, alkyl crotonate, dialkyl itaconate and dialkyl maleate. Alkyl methacrylate, and alkyl, aryl and allyl acrylate are particularly preferable among them. These monomers may be used alone, or as a mixture of at least two of them.

The water-soluble polymer may be used alone, or a plurality of them may be used by mixing. While the amount of addition of the polymer cannot be uniquely determined since it depends on the colorant, the water-soluble polymer is added in the range of preferably 0.1 to 100% by mass, more preferably in the range of 1 to 70% by mass, and further preferably in the range of 3 to 50% by mass based on the colorant.

The water-soluble polymer is preferably used as a salt with a basic compound. Examples of the basic compound used for forming a salt with the water-soluble polymer include alkali metals such as sodium, potassium and lithium; aliphatic amines such as monomethylamine, dimethylamine and triethylamine; and alcohol amines such as monomethanolamine, monoethanolamine, diethanolamine, triethanolamine and diisopropanolamine. The alkali metal salts such as sodium, potassium and lithium salts are used among them, since basic compounds of the alkali metals are strong electrolytes having a large effect of accelerating dissociation of acidic groups.

It is useful to add viscosity controlling agents such as methyl cellulose, ethyl cellulose and derivatives thereof, glycerin and polyglycerin, and polyethylene oxide or polypropylene oxide adducts of polyglycerin as well as polysaccharides and derivatives thereof to the ink of the invention. Specific examples of the viscosity control agent include glucose, fructose, mannitol, D-sorbitol, dextran, xanthan gum, curdlan, cycloamylose and multitose, and derivatives thereof.

The viscosity of the ink used for the ink jet recording method of the invention is preferably in the range of 1.5 to 5.0 mPa·s, more preferably in the range of 1.5 to 4.0 mPa·s. The viscosity of the ink is measured at 23° C. with a shear rate of 1400 $s^{-1}$ using a rotary viscometer Rheomat 115 (trade name, manufactured by Contraves Co.).

The pH of the ink may be adjusted to a desired value using, for example, potassium hydroxide, sodium hydroxide, lithium hydroxide, ammonium hydroxide, triethanolamine, diethanolamine, ethanolamine, 2-amino-2-methyl-1-propanol, ammonia, ammonium phosphate, potassium phosphate, sodium phosphate, lithium phosphate, sodium sulfate, acetate salts, lactate salts, benzoate salts, acetic acid, hydrochloric acid, nitric acid, sulfuric acid, phosphoric acid, propionic acid and p-toluenesulfonic acid. Otherwise, conventional buffering agents such as Good's buffer may be used.

The pH of the ink is preferably in the range of 3 to 11, particularly in the range of 4.5 to 9.5.

The ink preferably has a surface tension in the range of 20 to 37 mN/m. The ink too rapidly permeates into the recording sheet when the surface tension is less than 20 mN/m to make it difficult to insolubilize the colorant in the ink and to insolubilize the water-soluble polymer. Since the ink permeate deep into the recording sheet, the image density may decrease and the letters may be blurred. A surface tension of larger than 37 mN/m is also not preferable considering availability to high speed printing since the ink so slowly permeates into the recording sheet that drying of the ink may be retarded.

The surface tension of the ink is more preferably in the range of 25 to 37 mN/m, further preferably in the range of 28 to 35 mN/m.

The surface tension of the ink is measured at 23° C. and 55% RH using an Wilhelmy surface tension meter.

The surface tension of the ink is adjusted by adding at least one of the compounds selected from the group consisting of the surfactants, polyfunctional alcohols and monofunctional alcohols. At least one of the surfactants of the nonionic surfactants and anionic surfactants are preferably selected when the surfactants are used. The combined content of the compounds above is preferably in the range of 0.01 to 3.0% by mass, more preferably in the range of 0.03 to 2.0% by mass, and further preferably in the range of 0.05 to 1.5% by mass. The content of the surfactant is preferably 0.3 to 1.5% by mass when the surfactant is used alone.

When the monofunctional alcohol having an ether bond is used, the alcohol is at least one compound selected from the compounds having the general formula (2) below. The combined content of such alcohols in the ink is preferably in the range of 1 to 5% by mass, more preferably in the range of 2 to 10% by mass, and further preferably in the range of 3 to 8% by mass.

$$C_nH_{2n+1}(CH_2CRHO)_mH \tag{2}$$

In the general formula (2), n is an integer from 1 to 6, m is an integer from 1 to 3, and R represents an alkyl group with a carbon number of 1 to 5.

When the monofunctional alcohols other than those represented by the general formula (2) are used, ethanol, propanol and butanol are preferable. The combined content of these alcohols is preferably in the range of 1.0 to 8.0% by mass, more preferably in the range of 2.0 to 5.0% by mass. The surfactant, polyfunctional alcohol and monofunctional alcohol may be added together.

When the ink used for the ink jet recording method of the invention contains the pigment, a prescribed quantity of the pigment is added in an aqueous solution containing a prescribed amount of the pigment dispersant, the pigment is dispersed with a disperser after thoroughly stirring the solution, coarse particles are removed by centrifugation, and prescribed quantities of the water-soluble organic solvent and additives are added with stirring followed by filtration. Otherwise, a thick dispersion of the pigment prepared in advance is dilutes for preparing the ink. A pigment pulverizing step may be provided before the dispersion step, or the pigment may be added after mixing prescribed amounts of the water-soluble organic solvent, water and additives followed by dispersion with the disperser.

Any commercially available dispersers may be used. Examples of such disperser include a colloid mill, flow jet mill, thrasher mill, high speed disperser, ball mill, attriter, sand mill, sand grinder, ultra-fine mill, Eiger motor mill, Dyno-mill, pearl mill, agitator mill, Cobol mill, tri-roll mill, twin-roll mill, extruder, kneader, micro-fluidizer, laboratory homogenizer and ultrasonic homogenizer. These machines may be used alone, or in combination of at least two of them. A dispersion method that does not use any dispersion media is preferably used for preventing inorganic impurities from mingling, and the micro-fluidizer and ultrasonic homogenizer are preferably used for this purpose. The ultrasonic homogenizer is used in the examples of the invention.

The ink using the self-dispersible pigment as the pigment of the colorant can be obtained by the steps including: applying a surface modification treatment to the pigment; adding the pigment obtained in water; dispersing the pigment, if necessary, using the same disperser as described above after thorough stirring; removing coarse particles by centrifugation; and stirring, mixing and filtering the solution after adding a prescribed amount of the solvent.

When the recording sheet of the invention is printed by the ink jet method using the ink as described above, the amount of ink drops ejected from the nozzle is preferably in the range of 1 to 20 pl, more preferably in the range of 3 to 18 pl.

When the recording sheet is printed by a so-called thermal ink jet method by which droplets are formed by applying a heat energy with the amount of the ink drops in the range of 1 to 20 pl, more preferably in the range of 3 to 18 pl as described above, the volume average particle diameter of the dispersed particles in the ink is preferably in the range of 20 to 120 nm, and the number of the coarse particles having a diameter of not less than 500 nm is preferably not larger than $5\times10^5$ per 2 μl of the ink. A sufficient image density cannot be obtained when the volume average particle diameter is smaller than 20 nm, while clogging is liable to occur in the print head to fail in securing stable ejectability when the volume average particle diameter is larger than 120 nm. Clogging is also liable to occur in the print head when the number of the coarse particles with a volume average particle diameter of not less than 500 nm is not smaller than $5\times10^5$ per 2 μl of the ink. Stable ejection of the ink may be also impossible in this case. The number of the coarse particles is preferably not larger than $3\times10^5$, more preferably not larger than $2\times10^5$ per 2 μl of the ink.

The ink preferably has a storage modulus in the range of $5\times10^{-4}$ to $1\times10^{-2}$ at 24° C., because the appropriate elasticity in this range permits the behavior of the ink on the surface of the recording sheet to be favorable. The storage modulus is measured in a low shear rate region with an angular velocity in the range of 1 to 10 radian/second. The storage modulus in this range can be measured using an apparatus capable of measuring viscoelasticity in the low shear rate region such as VE viscoelasticity analyzer (trade name, manufactured by Vilastic Scientific Inc.) and DCR ultra-low viscosity viscoelastometer (trade name, manufactured by Paar Physica Co.).

Any known ink jet recording device is able to provide good image quality by using the ink jet recording method of the invention. The ink jet recording method of the invention is also applicable to a printing method in which the recording sheet and the ink are heated at a temperature of 50 to 200° C. by providing a heating device for heating the recording sheet before, during or after printing in order to facilitate absorption and fixing of the ink.

An example of the ink jet recording device suitable for applying the ink jet recording method of the invention will be described hereinafter. The ink jet recording device in this example is based on a so-called multi-path method in which the image is formed by plural times of scanning of the recording head on the surface of the recording sheet.

The ink ejection method employed is a so-called thermal ink jet method, wherein the ink in the nozzle is foamed by heating with an electric heater provided in the nozzle, and the ink is ejected by the pressure of bubbles. In another method, a piezoelectric element is physically deformed by flowing an electric current through the element, and the ink is ejected by taking advantage of a pressure caused by deformation. While any methods for ejecting the ink through the nozzle as described above may be employed in the ink jet recording device used for the ink jet recording method of the invention, the method is not restricted thereto including in the descriptions as set forth below.

The nozzles are aligned in an approximately perpendicular direction to the principal scanning direction of a head carriage. While the nozzles are aligned in a line with a density of 800 nozzles per one inch, the number and density of the nozzle may be arbitrarily determined. Alternatively, the nozzles may be staggered instead of aligning as a straight line.

Ink tanks filled with the cyan, magenta, yellow and black inks of the invention, respectively, are attached at the upper part of the recording head so that the tanks are integrated with the recording head. The ink filled in each tank is supplied to the recording head corresponding to each color. While the ink tank may be integrated with the head, each ink tank may be provided independently from the recording head in a different method. The ink is supplied to the recording head through an ink feed tube in the latter method.

Signal cables are connected to respective recording heads. Image information after being processed at an image processor with respect to each of the cyan, magenta, yellow and black colors is transferred to the recording head thorough the signal cable.

The recording head is fixed on a head carriage. The head carriage is attached to be freely slidable along a guide rod and carriage guide. The head carriage is able to reciprocate along the principal scanning direction by means of a timing belt by allowing a driving motor to rotate at a given timing.

A platen is fixed below the carriage, and the recording sheet used in the invention is transferred onto the platen with a paper transfer roller. The platen may be composed of, for example, a molded plastic.

The recording sheet of the invention can be thus printed using the ink as described above. While four heads are provided in the multi-path method described above, the application range of the ink jet method of the invention to the multi-path method is not restricted thereto. The printer may be provide with two heads of a black head and color head, the nozzle of the color head may be divided in the direction of alignment, and prescribed colors may be allotted to respective divided areas.

The printing head scanning speed means a transfer speed of the recording head when the surface of the recording sheet is printed by plural times of scanning of the recording head in the so-called multi-path method in which the printing head runs in a perpendicular direction to the recording sheet feed direction.

While it is inevitable for the printing head to have a scanning speed of not less than 25 cm/second when the printed is used at a high printing speed of not less than 10 ppm (10 sheets/minutes) that corresponds to the printing speed of an office laser printer, the printing space between different two colors is narrowed to readily cause inter color bleeding (ICB). While use of an ink having a low surface tension is required for enhancing dryability of the ink, such ink may cause feathering and low image density. Moreover, since the ink having a low surface tension has high permeability into the sheet, printed letters and pictures are liable to be seen from the back surface through the sheet to impair availability for printing on both surfaces of the sheet.

A second example of the ink jet recording device suitable for applying to the ink jet recording method of the invention will be described below. This example is related to a so-called single path method, in which a recording head having an approximately the same width as the width of the recording sheet is used, and printing is completed by allowing the recording sheet to pass under the recording head. High speed printing exceeding the laser recording method is possible since productivity of this method is higher than the multi-path method even when the scanning speed is the same between the two methods.

The single path method is ready for printing at a transfer speed of the recording sheet of as high as not less than 60 mm/second corresponding to the printing speed of not less than 10 ppm, since plural time of scanning is not necessary in the single path method as in the multi-path method. However, since divided printing is impossible, ejection of a large quantity of the ink is necessary in one scanning. Consequently, feathering and inter color bleeding are caused, the image density decreases, printability on both faces are deteriorated, and dryability becomes poor when conventional printing methods that do not use the recording sheet of the invention are employed.

However, the water-soluble carboxylic acid having a ring structure is promptly dissolved by allowing the recording sheet to contact the ink in the ink jet recording method of the invention, even in the multi-path method in which the scanning speed of the printing head is as high as not less than 250 mm/second, or in the single path method in which the transfer speed of the recording sheet is as high as not less than 60 mm/second while the printing head is fixed. Accordingly, high quality images can be obtained without causing feathering and inter color bleeding as a result of solidification of the ink and ink components, and aggregation and precipitation of the pigments in the ink. In addition, since permeation of vehicles is accelerated while the colorants in the ink is suppressed from permeating deep into the sheet, dryability may be improved without impairing printability on both faces.

The scanning speed of the printing head is preferably not less than 500 mm/second, more preferably not less than 1000 mm/second, from the view point of "productivity comparable to the laser printer". The transfer speed of the recording sheet is preferably not less than 100 mm/second, more preferably not less than 210 mm/second.

The maximum amount of ink bombardment is preferably in the range of 6 to 30 ml/m$^2$ in the ink jet recording method of the invention.

The maximum amount of ink bombardment refers to the amount of the ink per unit area ejected in one scanning when a solid image is formed using at least one color of the ink.

The maximum amount of ink bombardment becomes as large as not less than 6 ml/m$^2$ in any of both methods since a sufficient amount of the ink is applied on the recording sheet for forming the solid image by smaller times of scanning. However, an image without feathering and inter color bleeding can be obtained by using the ink jet recording method of the invention even by printing at a high speed requiring a large amount of ink bombardment. Therefore, printing on both surfaces is possible in the ink jet printing method of the invention with an image quality comparable to that of the laser printing method.

The maximum amount of ink bombardment is preferably in the range of 7 to 20 ml/m$^2$, more preferably in the range of 10 to 18 ml/m$^2$.

As hitherto described, the ink jet recording method of the invention enables to print with a sufficiently high image density without causing defective printing such as inter color bleeding and feathering even by using an ink jet recording device capable of high speed printing with a printing speed of as high as not less than 10 ppm.

(Electrophotographic Image Recording Method)

The electrophotographic image recording method of the invention includes: uniformly charging the surface of a electrostatic latent image holding member; exposing the surface of the electrostatic latent image holding member to form an electrostatic latent image; developing the electrostatic latent image formed on the surface of the electrostatic latent image holding member to form a toner image; transferring the toner image onto the recording sheet; and fixing the toner image on the image transfer member. The recording sheet of the invention is used for the recording sheet in this method.

A high quality image as in the conventional methods may be obtained by the electrophotographic image recording method of the invention.

The image forming apparatus used in the electrophotographic image recording method of the invention is not particularly restricted, so long as the method uses the electrophotographic method including the charging step, exposure step, development step, transfer step and fixing step as described above. For example, a color image forming apparatus by a four cycle development method in which a toner image is formed by sequentially applying developers containing four colors on a photosensitive member, or a color image forming apparatus including four development units corresponding to respective colors (a so-called tandem machine) may be used when for colors of cyan, magenta, yellow and black colors are used.

While the toners used for image forming are not particularly restricted so long as they are known toners, a spherical toner having a small particle diameter distribution is used for obtaining a highly precise image, or a toner containing a low melting point binder resin capable of being developed at low temperatures is used for reducing energy consumption.

EXAMPLES

The present invention will be described in more detail with reference to examples. However, these examples should not be construed to limit the scope of the invention.

The recording sheets used in the examples and comparative examples are manufactured as described below.

—Preparation of Recording Sheet—

<Recording Sheet 1>

A hard-wood kraft pulp is bleached by an ECF multistage bleaching method including oxygen bleaching, alkali extraction and gas phase chlorine dioxide treatment. The pulp obtained is beaten so that freeness thereof is 450 ml, and is formed into a sheet by blending 3 parts by mass of a bentonite filler, 3 parts by weight of precipitated calcium carbonate and 0.1 parts by weight of an alkylketene dimer internal sizing agent based on 100 parts by mass of the pulp. The sheet is further subjected to size-press by coating with a coating liquid including 90 parts by mass of water, 5 parts by mass of 2-pyrrolidone carboxylic acid, 4 parts by mass of oxidized starch (trade name Ace A, manufactured by Oji Cornstarch Co., Ltd.) as a water-soluble resin, and 1 part by mass of sodium sulfate as a conductive material to obtain a recording sheet 1 coated with 0.8 $g/m^2$ of 2-pyrrolidone carboxylic acid and 0.7 $g/m^2$ of oxidized starch.

Incidentally, coating of the conductive agent is not needed when the recording sheet is used only for ink jet recording. The same also applies to the examples for producing recording sheet described below.

<Recording Sheet 2>

A hard-wood kraft pulp is bleached by an ECF multistage bleaching method including xylanase treatment, alkali extraction, hydrogen peroxide treatment and ozone treatment. The pulp obtained is beaten so that freeness thereof is 450 ml, and is formed into a sheet by blending 3 parts by mass of kaolin as filler, 6 parts by mass of presipitated calcium carbonate as filler, and 0.2 parts by mass of alkenyl succinic anhydride (ASA) as an internal sizing agent based on 100 parts by mass of the pulp. The sheet is further subjected to size-press by coating with a coating liquid as a surface sizing agent including 85 parts by mass of water, 5 parts by mass of cation-modified polyvinyl alcohol (trade name Gosefimer, manufactured by Nippon Synthetic Chemical Industry Co., Ltd.) as a water-soluble resin and 10 parts by mass of 2-furan carboxylic acid to obtain recording sheet 2 having a surface coated with 2.0 $g/m^2$ of 2-furan carboxylic acid and 1.0 $g/m^2$ of cation-modified polyvinyl alcohol.

<Recording Sheet 3>

A soft-wood mechanical pulp is bleached with hydrosulfite, and is beaten so that freeness is 450 ml. The pulp is formed into a sheet by blending 8 parts by mass of precipitated calcium carbonate as filler and 0.02 parts by mass of alkenyl succinic anhydride as an internal sizing agent based on 100 parts by mass of the pulp. The sheet is subjected to size press by coating with a coating liquid as a surface sizing agent including 85 parts by mass of water, 2 parts by mass of nonionic polyvinyl alcohol (trade name PVA-117, manufactured by Kuraray Co., Ltd.) as a water-soluble resin, and 15 parts by mass of coumalic acid (coumalinic acid) to obtain recording sheet 3 having a surface coated with 3.0 $g/m^2$ of coumalic acid and 1.0 $g/m^2$ of nonionic polyvinyl alcohol.

<Recording Sheet 4>

A hard-wood sulfite pulp is bleached by the ECF method as in recording sheet 2. After beating, the pulp is formed into a sheet by blending 15 parts by mass of precipitated calcium carbonate as filler and 0.1 parts by mass of alkenyl succinic anhydride (ASA) as an internal sizing agent based on 100 parts by mass of the pulp. The sheet is further subjected to size press by coating with a coating liquid as a surface sizing agent including 80 parts by mass of water, 5 parts by mass of cationic starch (trade name Ace 9, manufactured by Oji Cornstarch Co., Ltd.) as a water-soluble resin and 10 parts by mass of 4-pyrone-2,6-dicarboxylic acid to obtain recording sheet 4 having a surface coated with 2.0 $g/m^2$ of 4-pyrone-2,6-dicarboxylic acid and 0.8 $g/m^2$ of cationic starch.

<Recording Sheet 5>

A hard-wood kraft pulp is bleached by the ECF method as in recording sheet 2. After beating, the pulp is formed into a sheet by blending with 20 parts by mass of kaolin as filler and 0.05 parts by mass of alkylketene dimer (AKD) as an internal sizing agent. The sheet is further subjected to size press by coating with a surface sizing agent including 90 parts by mass of water and 10 parts by mass of oxidized starch (trade name Ace A, manufactured by Oji Cornstarch Co., Ltd.) as a water-soluble resin to obtain recording sheet 5 having a surface coated with 3.0 $g/m^2$ of oxidized starch.

—Measurement of Properties of Recording Sheet—

The properties of the recording sheet obtained are measured under the following conditions.

The Stockigt sizing degree is measured at a temperature of 23° C. and a relative humidity of 50% RH according to JIS P8122:1976.

Smoothness is measured using Ohken digital display air resistance and smoothness tester type EY (trade name, manufactured by Asahi Seiko Co.) according to JIS P8119:1998. The formation index is measured using three-dimensional Sheet Analyzer M/K 950 (trade name, manufactured by M/K Systems (MKS) Inc.) with a radius of the diaphragm aperture of 1.5 mm using a micro-formation tester (MFT). The results are shown in Table 1.

TABLE 1

| Recording sheet No. | Carboxylic Acid: Kind | Carboxylic Acid: Amount of Coating ($g/m^2$) | Stockigt Sizing Degree (second) | Smoothness (second) | Formation Index |
|---|---|---|---|---|---|
| 1 | 2-pyrrolidone carboxylic acid | 0.8 | 50 | 100 | 30 |
| 2 | 2-furan carboxylic acid | 2.0 | 60 | 120 | 40 |
| 3 | Coumalic acid | 3.0 | 40 | 80 | 20 |
| 4 | 4-pyrone-2,6-dicarboxylic acid | 2.0 | 45 | 100 | 30 |
| 5 | — | — | 50 | 120 | 30 |

—Preparation of Ink—

The inks used in the examples and comparative examples below are prepared as follows.

<Ink 1>

Added with stirring is 45 parts by mass of carbon black (trade name BPL, manufactured by Cabot Corporation) while 45 parts by mass of an aqueous solution (with a solid fraction of 10% by mass) of a styrene/methacrylic acid copolymer sodium salt (monomer ratio: 50/50, weight average molecular weight: 7,000) as a water-soluble polymer (a dispersant for dispersing pigments) and 210 parts by mass of ion-exchange water are mixed with stirring. Carbon black is dispersed thereafter with a micro-fluidizer at 10000 psi/30 path. The dispersed solution is adjusted at pH 9 with an aqueous NaOH solution with a concentration of 1 mol/liter. After centrifugation (8,000 rpm, 15 minutes) with a centrifuge, the solution is filtered by passing through a membrane filter with a pore diameter of 2 μm. The dispersion solution obtained is diluted with pure water to obtain pigment dispersion solution 1 with a solid fraction of 10% by mass.

Subsequently, the concentration of a mixture having the composition described below is adjusted to 50 parts by mass by adding deionized water followed by stirring for 30 minutes. Further added is 50 parts by mass of pigment dispersion solution 1 followed by stirring for additional 30 minutes. Ink 1 is prepared by allowing the solution to pass through a membrane filter with a pore diameter of 2 μm. Ink 1 has a surface tension of 35 mN/m, a viscosity of 2.6 mPa·s and a storage modulus of $1.0\times10^{-3}$ Pa at 24° C. The number of coarse particles with a particle diameter of not less than 500 nm in ink 1 is $11.2\times10^{4}$ particles.

| | |
|---|---|
| ethyleneglycol | 12 parts by mass |
| ethanol | 4 parts by mass |
| urea | 5 parts by mass |
| sodium lauryl sulfate ester | 0.1 parts by mass |

<Ink 2>

Pigment dispersion solution 2 (pigment concentration 14.4% by mass) is obtained by a centrifugation treatment (8,000 rpm, 40 minutes) of Cabojet 300 (trade name, manufactured by Cabot Corporation).

Subsequently, the concentration of a mixture having the composition described below is adjusted to 50 parts by mass by adding deionized water. The total quantity of the mixture is adjusted to 100 parts by mass by adding 50 parts by mass of pigment dispersion solution 2, and an aqueous lithium hydroxide solution with a concentration of 1 mol/liter is added dropwise until the pH of the mixed solution becomes 8.0. Ink 2 is prepared by stirring for 30 minutes thereafter followed by allowing the solution to pass through a membrane filter with a pore diameter of 2 μm. The ink has a surface tension of 33 mN/m, a viscosity of 2.1 mPa·s and a storage modulus of $5.0\times10^{-3}$ Pa at 24° C. The number of coarse particles with a particle diameter of not less than 500 nm in ink 1 is $18.6\times10^{4}$ particles.

| | |
|---|---|
| pigment dispersion solution | 35 parts by mass |
| diethyleneglycol | 18 parts by mass |
| urea | 5 parts by mass |
| water-soluble polymer <n-butyl methacrylate/methacrylate copolymer (monomer ratio: 50/50, weight average molecular weight: 8,200)> | 1.5 parts by mass |

<Ink 3>

The total quantity of a mixture having the composition below is adjusted to 100 parts by mass by adding deionized water, and the mixture is stirred for 30 minutes, Ink 3 is prepared by allowing the solution to pass through a membrane filter with a pore diameter of 2 μm. Ink 3 has a surface tension of 30 mN/m, a viscosity of 2.8 mPa·s and a storage modulus of $2.5\times10^{-3}$ Pa at 24° C. The number of coarse particles with a particle diameter of not less than 500 nm in ink 3 is $0.08\times10^{4}$ particles.

| | |
|---|---|
| pigment (C.I. Pigment Blue 15:3) | 4 parts by mass |
| water-soluble polymer <styrene acrylic acid/potassium acrylate copolymer (monomer ratio: 33/67, weight average molecular weight: 6,100)> | 1.5 parts by mass |
| diglycerin-ethylene oxide adduct | 5 parts by mass |
| sulfolane | 5 parts by mass |
| surfactant (trade name Nonion E-215, manufactured by Nippon Oil & Fats Co., Ltd.) | 0.03 parts by mass |

<Ink 4>

The total quantity of a mixture having the composition below is adjusted to 100 parts by mass by adding deionized water, and the mixture is stirred for 30 minutes. Ink 4 is prepared by allowing the solution to pass through a membrane filter with a pore diameter of 2 μm. Ink 4 has a surface tension of 30 mN/m, a viscosity of 2.8 mPa·s and a storage modulus of $2.5\times10^{-3}$ Pa at 24° C. The number of coarse particles with a particle diameter of not less than 500 nm in ink 3 is $0.08\times10^{4}$ particles.

| | |
|---|---|
| pigment (C.I. Pigment Blue 15:3) | 4 parts by mass |
| water-soluble polymer <styrene acrylic acid/potassium acrylate copolymer (monomer ratio: 33/67, weight average molecular weight: 6,100)> | 1.5 parts by mass |
| diglycerin-ethylene oxide adduct | 5 parts by mass |
| sulfolane | 5 parts by mass |
| surfactant (trade name Nonion E-215, manufactured by Nippon Oil & Fats Co., Ltd.) | 0.03 parts by mass |

<Ink 5>

The total quantity of a mixture having the composition below is adjusted to 100 parts by mass by adding deionized water, and the mixture is stirred for 30 minutes. Ink 5 is prepared by allowing the solution to pass through a membrane filter with a pore diameter of 2 μm. Ink 5 has a surface tension of 29 mN/m, a viscosity of 2.9 mPa·s and a storage modulus of $1.0\times10^{-2}$ Pa at 24° C. The number of coarse particles with a particle diameter of not less than 500 nm in ink 3 is $0.03\times10^{4}$ particles.

| | |
|---|---|
| surface-treated pigment (C.I. Pigment Yellow 17) | 4 parts by mass |
| water-soluble polymer <styrene acrylic acid/sodium acrylate copolymer (monomer ratio: 20/80, weight average molecular weight: 6,000)> | 1.5 parts by mass |
| glycerin | 15 parts by mass |
| triethyleneglycol monobutylether | 5 parts by mass |
| surfactant (trade name Safinol TG, manufactured by Nisshin Chemicals Co., Ltd.) | 0.03 parts by mass |

<Ink 6>

The total quantity of a mixture having the composition below is adjusted to 100 parts by mass by adding deionized water, and the mixture is stirred for 30 minutes. Ink 6 is prepared by allowing the solution to pass through a membrane filter with a pore diameter of 1 μm. Ink 6 has a surface tension of 29 mN/m, a viscosity of 2.0 mPa·s and a storage modulus of $1.0\times10^{-2}$ Pa at 24° C.

| | |
|---|---|
| dye (10% aqueous solution of Direct Red 227) | 20 parts by mass |
| ethyleneglycol | 25 parts by mass |
| water-soluble polymer <styrene maleic acid/sodium methacrylate copolymer (monomer ratio: 20/80, weight average molecular weight: 6,000)> | 1.5 parts by mass |
| urea | 5 parts by mass |
| surfactant (trade name Safinol 465) | 2 parts by mass |

—Measurement of the Ink Properties—

The properties of the ink are measured under the following condition. The surface tension is measured at 23° C. and 55% RH using an Wilhelmy surface tension meter. A measuring vessel is filled with the ink and attached to Neomat 115 (trade name, manufactured by Contraves Co.), and the viscosity is measured at a temperature of 23° C. and a shear rate of 1,400 $s^{-1}$. The results are shown in Table 2.

The storage modulus at 24° C. is measured using VE viscoelastic analyzer (trade name, manufactured by Vilastic Scientific, Inc.) at an angular velocity range of 1 to 10 radian/second. The storage modulus at an angular velocity of 10 radian/second is shown in Table 2 as a representative value.

TABLE 2

| Ink No. | Surface Tension (mN/m) | Water-Soluble Polymer |
|---|---|---|
| 1 | 35 | sodium salt of styrene/methacrylic acid copolymer |
| 2 | 33 | n-butyl methacrylate/methacrylic acid copolymer |
| 3 | 30 | styrene acrylic acid/potassium acrylate copolymer |
| 4 | 30 | styrene sulfonic acid/potassium acrylate copolymer |
| 5 | 29 | styrene maleic acid/sodium methacrylate copolymer |
| 6 | 29 | styrene maleic acid/sodium methacrylate copolymer |

Examples 1 to 4 and Comparative Example 1

Print tests are performed using the ink jet recording device and electrophotographic recording device described below by combining the recording sheets and inks obtained above, and the results are evaluated The results are shown in Table 3. The "No." in the cell of "Recording sheet" in Table 3 refers to each recording sheet used in the examples and comparative examples (for example, recording sheet 2 in Example 1), and the "No." in the cell of "Ink" refers to each ink used in the examples and comparative examples (for example, Inks 1 and 4 in Example 1).

Work Center B900 (trade name, manufactured by Fuji Xerox Co., Ltd.) is used as the thermal ink jet recording device in the printing test. Images are printed at 23° C. and 55% RH. The nozzle pitch is 800 dpi per 256 nozzles, the amount of one drop is about 15 pl, the maximum amount of ink bombardment is about 15 ml/$m^2$, the printing mode is collective printing on one side of the sheet, and the head scanning speed is about 1100 mm/second. Each evaluation item is described below.

—Optical Density of Image—

The optical density of solid patch images one day after printing is measured using X-rite 369 (trade name, manufactured by X-Rite Incorporated.).

—Inter Color Bleeding (ICB)—

Black and color inks are printed as 2 cm×2 cm square patches so that different color patches contact to one another. Color mixing between adjoining printed images is visually evaluated by 10 persons based on the following criteria. The sheets evaluated as "○" and "Δ" are regarded to be practically acceptable.

○: No color mixing at all.

Δ: Colors are slightly mixed, but color mixing is practically acceptable.

×: Color mixing is not practically acceptable.

—Evaluation of Feathering—

Characters and letters with a font size of 8 point are printed with the black ink and color inks. Feathering is visually evaluated by the following criteria. The sheets evaluated as "◎" and "○" are regarded to be practically acceptable.

◎: Bleeding of the ink is not observed at all in Chinese characters and cursive kana letters.

○: Quite little bleeding of the ink is observed in Chinese characters and cursive kana letters.

×: Bleeding is observed in Chinese characters and cursive kana letters, and printed sheet cannot be practically used.

—Evaluation of Ink Drying Time—

The ink drying time is evaluated by observing transfer of the ink when a sheet is pressed onto printed images immediately after printing and after an appropriate time lapse from printing, and the time when the images is not transferred onto the sheet is measured. The image is printed as solid patches, and the drying time of the ink is evaluated. The sheets evaluated as "◎" and "○" are regarded to be practically acceptable.

◎: Drying time is less than 2 seconds.

○: Drying time is 2 seconds or more and less than 5 seconds.

Δ: Drying time is 5 seconds or more and less than 10 seconds.

×: Drying time is 10 seconds or more

—Evaluation of See-Through of Images from the Back—

The image density of a solid patch image on the back surface of the printed surface one day after printing is measured using X-rite 369 (trade name, manufactured by X-Rite Incorporated.).

Images are also recorded using Docu Centre Color 400 CP (trade name, manufactured by Fuji Xerox Co., Ltd.) as the electrophotographic recording device, and the image density and mottles of the image density are evaluated based on the criteria below. The results are shown in Table 4.

The image recording using Docu Centre Color 400 CP includes charging, exposure, development and fixing steps.

—Evaluation of Image Density—

Recording sheets in the examples and comparative examples are equilibrated in an environment at 20° C. and 85% RH, and a 100% solid image of magenta with a size of 5 cm×5 cm is printed on each recording sheet. The optical density of the image is measured using X-rite 369 (trade name, manufactured by X-Rite Incorporated.). The optical density is evaluated based on the following criteria. The sheets evaluated as "◎" and "○" are regarded to be practically acceptable.

◎: optical density of not less than 1.5

○: optical density of not less than 1.1 and less than 1.5

×: optical density of less than 1.1

—Evaluation of Mottles of the Image Density—

The level of mottles of the image is observed in the image printed for evaluation of the image density. The level of mottles is evaluated based on the following criteria. The sheets evaluated as "◎" and "○" are regarded to be practically acceptable.

TABLE 3

| | Ink Jet Recording Method | | | | | | | Electrophotographic Recording Method | |
|---|---|---|---|---|---|---|---|---|---|
| | Sheet No. | Ink No. | Image Density | ICB | Feathering | Drying Time | Optical Density on the Back Surface | Image Density | Mottles |
| Example 1 | 2 | 1 | 1.41 | ○ | ◎ | ◎ | 0.11 | ◎ | ◎ |
| | | 3 | 1.28 | | ◎ | ◎ | 0.12 | | |
| Example 2 | 1 | 2 | 1.40 | ○ | ◎ | ◎ | 0.1 | ◎ | ◎ |
| | | 4 | 1.30 | | ○ | ◎ | 0.11 | | |
| Example 3 | 3 | 1 | 1.41 | ○ | ◎ | ◎ | 0.12 | ○ | ○ |
| | | 6 | 1.25 | | ○ | ◎ | 0.11 | | |
| Example 4 | 4 | 2 | 1.40 | ○ | ◎ | ◎ | 0.1 | ◎ | ◎ |
| | | 5 | 1.20 | | ◎ | ◎ | 0.15 | | |
| Comparative Example 1 | 5 | 1 | 1.30 | X | X | ○ | 0.13 | ◎ | ◎ |
| | | 3 | 1.08 | | X | ○ | 0.14 | | |

Table 3 shows that inter color bleeding and feathering are excellent while the image density is high, dryability is good and the image density on the back face of the recording sheet that shows printability on both surfaces is decreased when the image is printed on the recording sheet of the invention using an ink jet recording device as compared with the recording sheet in the comparative example. The recording sheet of the invention can be also used for electrophotographic printing as using conventional recording sheet.

The recording sheet of the invention is able to use for ink jet recording as well as for electrophotographic recording. The invention provides a recording sheet and an image recording method using the recording sheet, wherein the ink is rapidly dried, the image density obtained is high with little inter color bleeding and feathering, and the image density on the back face of the printed face is small.

What is claimed is:

1. An ink jet image recording method for recording an image on a recording sheet, the method comprising ejecting droplets of an ink that comprises a hydrophilic colorant and at least one of water and a water-soluble organic solvent on a surface of the recording sheet so as to record an image thereon;

wherein the ink comprises a water-soluble polymer having a hydrophobic portion and a hydrophilic portion;

wherein the recording sheet comprises carboxylic acid and base paper;

wherein the base paper comprises pulp fiber and filler;

wherein the solubility of the carboxylic acid in water at 20° C. is not less than 1 gram per 100 grams of water, and the carboxylic acid is applied to the base paper in an amount from 0.1 $g/m^2$ to 5 $g/m^2$; and wherein the hydrophilic portion of the water-soluble polymer comprises a carboxyl group.

2. The image recording method of claim 1, wherein the ink has a viscosity of 1.5 to 5.0 mPa·s.

3. The image recording method of claim 1, wherein the ink has a surface tension of 20 to 37 mN/m.

4. The image recording method of claim 1, wherein the ink has a storage modulus of $5\times10^{-4}$ to $1\times10^{-2}$ Pa at 24° C.

5. The image recording method of claim 1, wherein each droplet of the ink ejected on the surface of the recording sheet has an amount of 1 to 20 pl.

* * * * *